(12) United States Patent
Wilkinson et al.

(10) Patent No.: US 8,276,580 B2
(45) Date of Patent: Oct. 2, 2012

(54) MODULAR TRANSPIRED SOLAR AIR COLLECTOR

(75) Inventors: Brian Wilkinson, Kirkland (CA); Vlad Ionescu, Lachine (CA)

(73) Assignee: Matrix Energy Inc., Pointe Claire (Quebec) (CA)

( * ) Notice: Subject to any disclaimer, the term of this patent is extended or adjusted under 35 U.S.C. 154(b) by 275 days.

(21) Appl. No.: 12/692,318

(22) Filed: Jan. 22, 2010

(65) Prior Publication Data

US 2010/0206297 A1    Aug. 19, 2010

(51) Int. Cl.
*E04D 13/18* (2006.01)
(52) U.S. Cl. .......... 126/628; 126/633; 126/591
(58) Field of Classification Search .......... 126/628, 126/633, 569, 584, 591
See application file for complete search history.

(56) References Cited

U.S. PATENT DOCUMENTS

| | | | |
|---|---|---|---|
| 7,677,243 B2 * | 3/2010 | McClendon | 126/621 |
| 2008/0060635 A1 | 3/2008 | Wilkinson | |

* cited by examiner

*Primary Examiner* — Alfred Basichas
(74) *Attorney, Agent, or Firm* — McDermott Will & Emery LLP

(57) ABSTRACT

A solar air heating module provides heated air to a ventilation system. The solar air heating module includes a collector for heating and drawing in outside air and a housing. The collector includes an absorber plate for absorbing incident sunlight and includes a plurality of perforations therethrough. The perforations are distributed across the absorber plate for allowing passage of air into the collector. The collector also includes a collector tray mounted behind the absorber plate. The collector tray includes an output for allowing the passage of air out of the collector. The collector tray is spaced from the absorber plate to define a cavity therebetween in which air can to flow towards the output. The housing is mounted to the collector tray and forms a plenum therewith for receiving air from the output. The plenum is at a lower pressure than that of the outside air. The plenum is connected to the ventilation system. A plurality of modules may be combined to form a system.

15 Claims, 5 Drawing Sheets

MODULAR TRANSPIRED SOLAR AIR COLLECTOR

FIELD OF THE INVENTION

The present invention relates to methods and apparatuses solar air heating, and more specifically to a solar air heating module and a system of such modules.

BACKGROUND OF THE INVENTION

Solar air heating systems are known in the art. Such systems are typically mounted to the exterior of a building, either over its walls or on its roof, and can be used to heat ventilated fresh air brought into the building, or alternatively can be used to heat recirculated air. Heat energy enters the system via a collector and is transported through a plenum which is at a lower pressure than the surrounding air.

Conventional active solar air conditioning systems for heating or cooling using a modular collector typically fall into one of two categories—glazed and unglazed systems. Glazed collectors are typically closed loop systems wherein the air to be heated is closed within the space it is heating and this same air is recycled through the collector. Glazed collectors are typically designed for space heating and cooling applications and are comprised of an exterior glazing and an internal absorber plate. The absorber plate is provided in direct contact with a recycled fluid such as air or water, and the whole is contained within a single assembly usually no more than 3.0 $m^2$ in size. Such collectors have operating efficiencies typically in the range of 30-50% and are typically designed for residential applications due to the limited amount of total air volume that may be delivered by them.

Unglazed systems are typically categorized as either transpired or backpass collectors. Transpired collectors generally consist of a dark exterior absorber with small holes spaced uniformly across its surface. As sunlight strikes the dark surface it absorbs the heat and conducts it from the surface. An approximately 1 mm thick thermal boundary layer of air is formed on the exterior of the absorber and this heated layer is pulled into a plurality of holes which are distributed over the absorber before the heat can escape by convection. These systems typically result in efficiencies of up to 75%.

In a backpass system, sunlight heats a dark surface and incoming air is heated as it is passed behind the non-perforated absorber. While inexpensive and simple to construct, backpass systems typically require that the air must travel across the back of the absorber a long distance, preferably in turbulent flow, so as to pick up as much heat as possible.

It is known that to maximize performance current systems must use a complicated arrangement of baffles or dampers within the plenum that must be carefully adjusted prior to system operation to regulate the air flow within a series of modules. Such arrangements can, however, compromise the total systems energy output.

There remains a need for an improved device which, by virtue of its design and components, would be able to overcome some of the aforementioned prior art problems.

SUMMARY OF THE INVENTION

An aspect of the present invention is to provide an apparatus which, by virtue of its design and components, satisfies some of the above-mentioned needs and is thus an improvement over other related devices.

Indeed, according to a preferred embodiment of the present invention, there is provided a solar air heating module for providing heated air to a ventilation system. The solar air heating module includes a collector for heating and drawing in outside air and a housing. The collector includes an absorber plate for absorbing incident sunlight and includes a plurality of perforations therethrough. The perforations are distributed across the absorber plate for allowing passage of air into the collector. The collector also includes a collector tray mounted behind the absorber plate. The collector tray includes an output for allowing the passage of air out of the collector. The collector tray is spaced from the absorber plate to define a cavity therebetween in which air can to flow towards the output. The housing is mounted to the collector tray and forms a plenum therewith for receiving air from the output. The plenum is at a lower pressure than that of the outside air. The plenum is connected to the ventilation system.

According to another preferred embodiment of the present invention, there is provided a plurality of connected modules. Each module includes a collector for heating and drawing in outside air and a housing. The collector includes an absorber plate for absorbing incident sunlight and includes a plurality of perforations therethrough. The perforations are distributed across the absorber plate for allowing passage of air into the collector. The collector also includes a collector tray mounted behind the absorber plate. The collector tray includes an output for allowing the passage of air out of the collector. The collector tray is spaced from the absorber plate to define a cavity therebetween in which air can to flow towards the output. The housing is mounted to the collector tray and forms a plenum therewith for receiving air from the output. The plenum is at a lower pressure than that of the outside air. At least one of the plenums is connected to the ventilation system.

Preferably the output(s) include(s) a plurality of openings distributed across the respective collector tray. Alternatively, the output(s) is (are) positioned at a bottom corner of the respective collector tray.

The invention and its advantages will be better understood by reading the following non-restrictive description of a preferred embodiment thereof, made with reference to the accompanying drawings.

BRIEF DESCRIPTION OF THE DRAWINGS

The invention will be better understood upon reading the following non-restrictive description of the preferred embodiment thereof, made with reference to the accompanying drawings in which:

FIG. 2a is a close-up of a portion of FIG. 2.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DETAILED DESCRIPTION OF THE PREFERRED EMBODIMENTS OF THE INVENTION

In the following description, the same numerical references refer to similar elements. The embodiments shown in the figures are preferred, for exemplification purposes only.

Although the preferred embodiments of the present invention as illustrated in the accompanying drawings comprise various components, etc., and consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations therebetween, as well as other suitable geometrical configurations may be used for the apparatus according to the present invention, as will be briefly explained herein and as can be easily inferred herefrom by a person skilled in the art, without departing from the scope of the invention.

Figure 1:
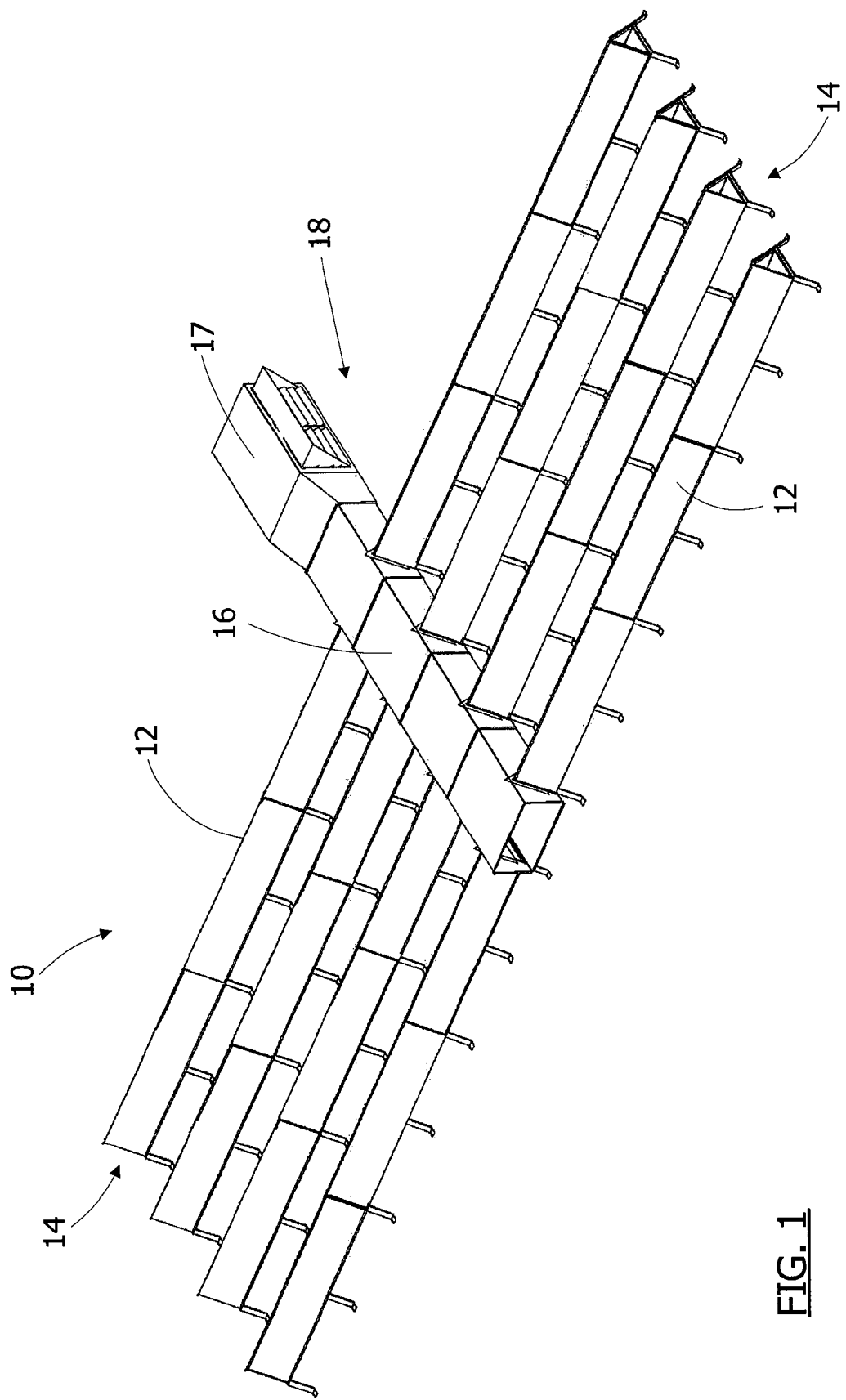
FIG. 1 is a perspective view of a modular collector system in accordance with an embodiment of the present invention.

With reference to FIG. 1, a system 10 of modules 12 is shown. A plurality of modules 12 are connected in series to form rows 14. A duct 16 is provided to connect parallel modules 12, thereby connecting the rows 14 to form an array 18 of modules 12 in parallel and in series. In the embodiment illustrated in FIG. 1, six modules 12 are connected end-to-end form a row 14 and four rows 14 form the system 10, although it will be appreciated that more or less modules 12 or rows 14 could be similarly provided without departing from the scope of the present invention.

As will be discussed in further detail below, air is operable to flow into each module 12, along the rows 14 to the duct 16 and then onward into the building's ventilation system. This ventilation system may be what's commonly referred to as a HVAC system (heating, ventilating and air conditioning) or another system which used heated air.

It will be appreciated that a single row 14 of modules 12 could be provided with an aspiration duct or the like at either end, which then connects with the building's ventilation system. Alternatively, a series of individual modules 12 could be mounted transversely along a duct 18 in parallel.

Figure 2:
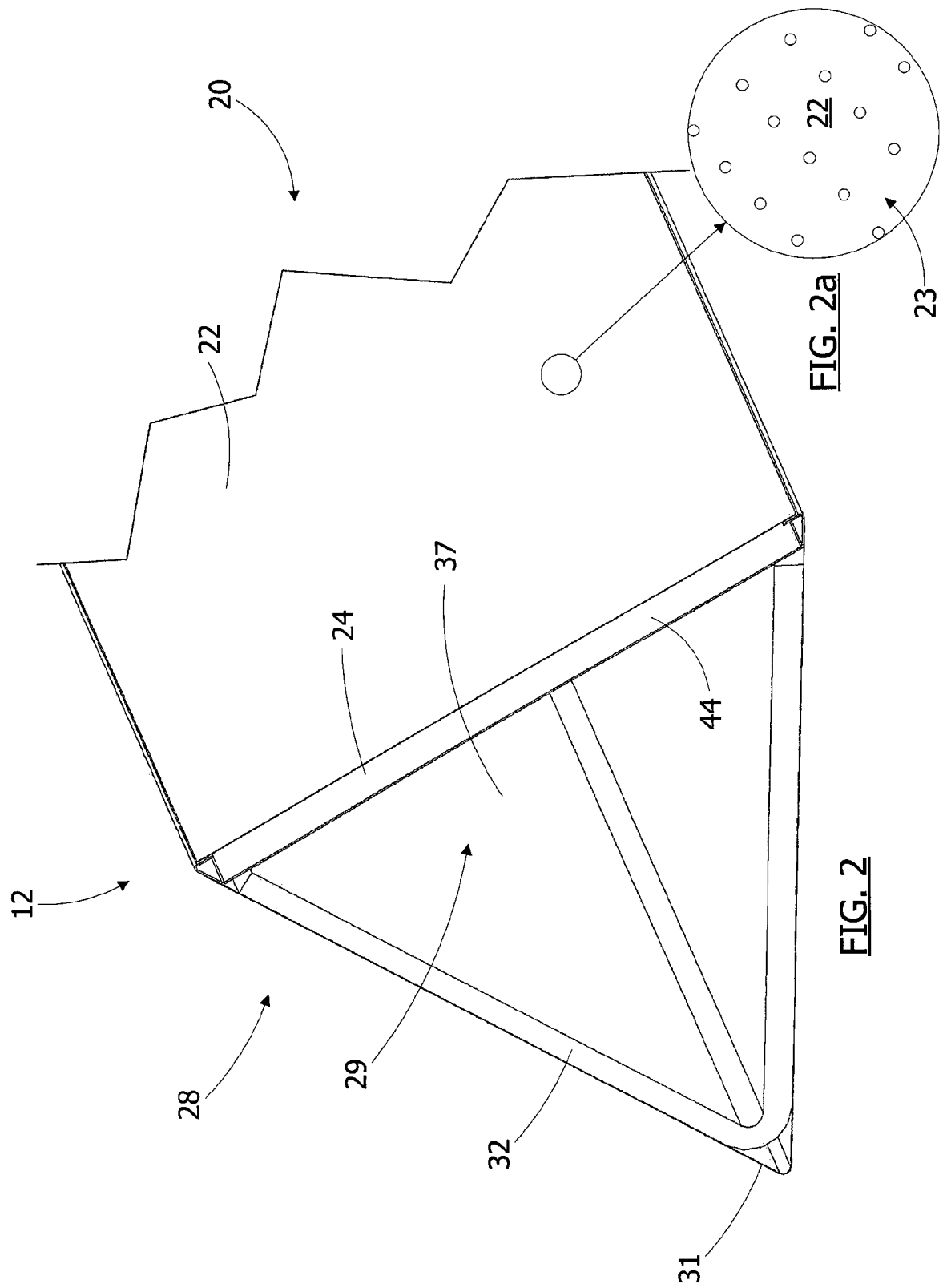
FIG. 2 is a perspective view of a cross section of a module in accordance with an embodiment of the present invention.
Figure 5:
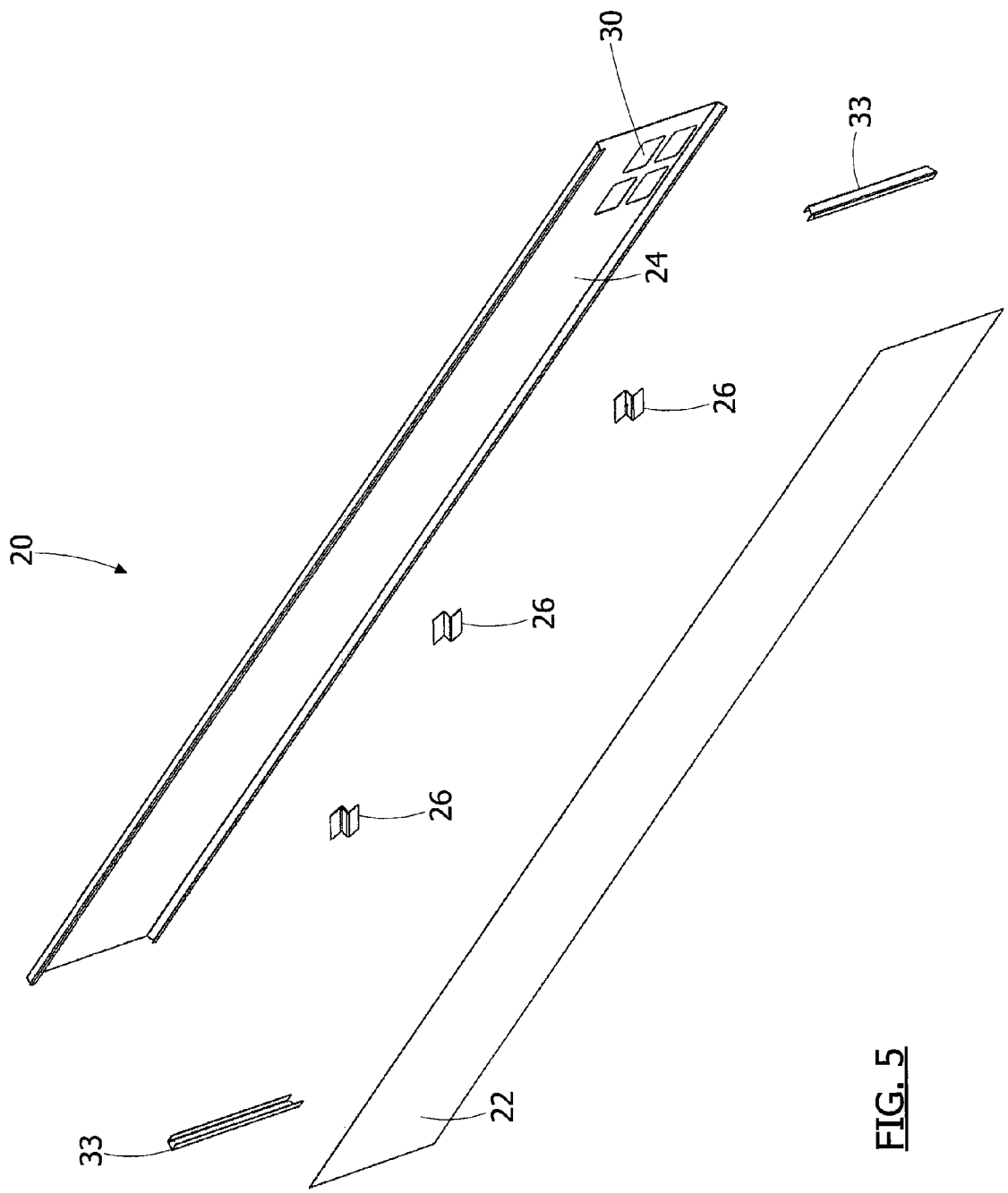
FIG. 5 is an exploded view a collector in accordance with an embodiment of the present invention.

With reference to FIGS. 2 and 5, each module 12 is provided with a transpired collector 20 comprising of an exterior absorber plate 22 (transpired cladding) and an interior backplate 24, also called a collector tray 24. The absorber plate 22 and the collector tray 24 are located parallel to one another and form a cavity 44 therebetween. The collector 20 and the housing 28 extend between the two openings 37 at the extremities of the module 12.

The absorber plate 22 comprises a plurality of perforations 23 across its surface, as seen if FIG. 2a, for use in drawing the outside air. Preferably, these perforations 23 are distributed evenly, although variations are well within the scope of the present invention. In use, incident sunlight will heat a boundary layer across exterior of the absorber plate 22 and this heated air will be drawn into the collector 20.

The collector 20 can be provided with one or more projections 26 within the cavity 44. These projections can be used to structurally reinforce the collector 20 by spanning the cavity 44. Alternatively, or in addition, these projections 26 can function as deflectors for disrupting the flow of air from the perforations 23 and stimulating air turbulence. As illustrated, the deflectors 26 comprise sections of z-channels 26 attached to the collector tray 24. It will further be appreciated that the depth of the collector can also have an effect of the turbulence of the flow therewithin. A pair of collector caps 33 (shown in FIGS. 3 and 5) is further provided for closing the longitudinal ends of each collector 20.

A housing 28 is mounted to the collector 20, thereby forming a plenum 29 through which air from the collector 20 can flow towards the ventilation system. The collector tray 24 is provided with an output 30 in order to allow air to flow from within the collector 20 into the plenum 29. The output 30 may, as illustrated, take the form of openings 30 located at a bottom corner of the collector tray 24 although it will be appreciated that variations of the size, shape and position of the openings 30 may similarly be used.

In particular, the openings 30 may be distributed across the collector tray 24. Preferably, such distributed openings 30 may each be provided with an overhang extending into cavity 44, thereby directing water, such as rain water, down to the bottom of the collector 20 where it can be drained and preventing that water from entering the plenum 29.

Preferably, the absorber plate 22 is substantially flat in order to present a uniform incident angle and reduce the system's total mass, thereby resulting in higher temperature gains and heat transfer while reducing total material cost and perimeter air leakage. However, vertical or horizontal channels (not shown) provided along the absorber plate 22 may be desirable in high wind conditions. The absorber plate 22 is preferably made from a metal, although the entire module 12 could also be made of a non-ferrous, polycarbonate material for cost reduction without sacrificing performance. More specifically, the absorber plate 22 may be made of ferrous metal, such as steel, or a non-ferrous metal, such as aluminum, or a polycarbonate or polyvinyl carbonate "plastic". The plastic material may be transparent or translucent. The exterior surface is preferably provided with a selective coating with high absorptivity and low emissivity characteristics. The flat or minimally profiled sun facing surface of the absorber plate 22 is so designed so as to maximize the exposed surface to sunlight and reduce self-shading, reduce the potential air suction that may form in high ambient wind and low collector aspiration rates.

Similarly, the collector tray 24 may be made of ferrous or non-ferrous metal material, or polycarbonate or polyvinyl carbonate "plastic". The plastic material may be transparent or translucent. The exterior-facing surface may have a selective coating with high absorptivity and low emissivity characteristics.

The housing 28 includes a casing 31 layered with an insulating material 32 such as glass fibre, foam or another bonded, fire resistant material containing an anti-microbial agent. Preferably, the casing is a single piece of formed sheet metal in order to increase cost effectiveness and prevent unwanted air infiltration.

The housing 28 may be made of a ferrous or non-ferrous metal, or polycarbonate, or polyvinyl carbonate "plastic". The plastic material may be transparent or translucent. It will be noted, however that if the absorber 22 is transparent or translucent, then an inner layer such as the collector tray 24 should be opaque, and preferably dark in colour. The exterior surface may have a selective coating with high absorptivity and low emissivity characteristics in order to maximize heat gain from reflected and diffuse light and in order to reduce the thickness or R-value of the insulation 32 required.

The modules 12 preferably have a triangular form in order to optimize solar gain and minimize both the wind loads imparted on the roof or wall onto which it is installed. Moreover, a triangular shape may promote snow shedding and reduce the accumulation of snow, and the associated loads, caused by wind.

Figure 3:
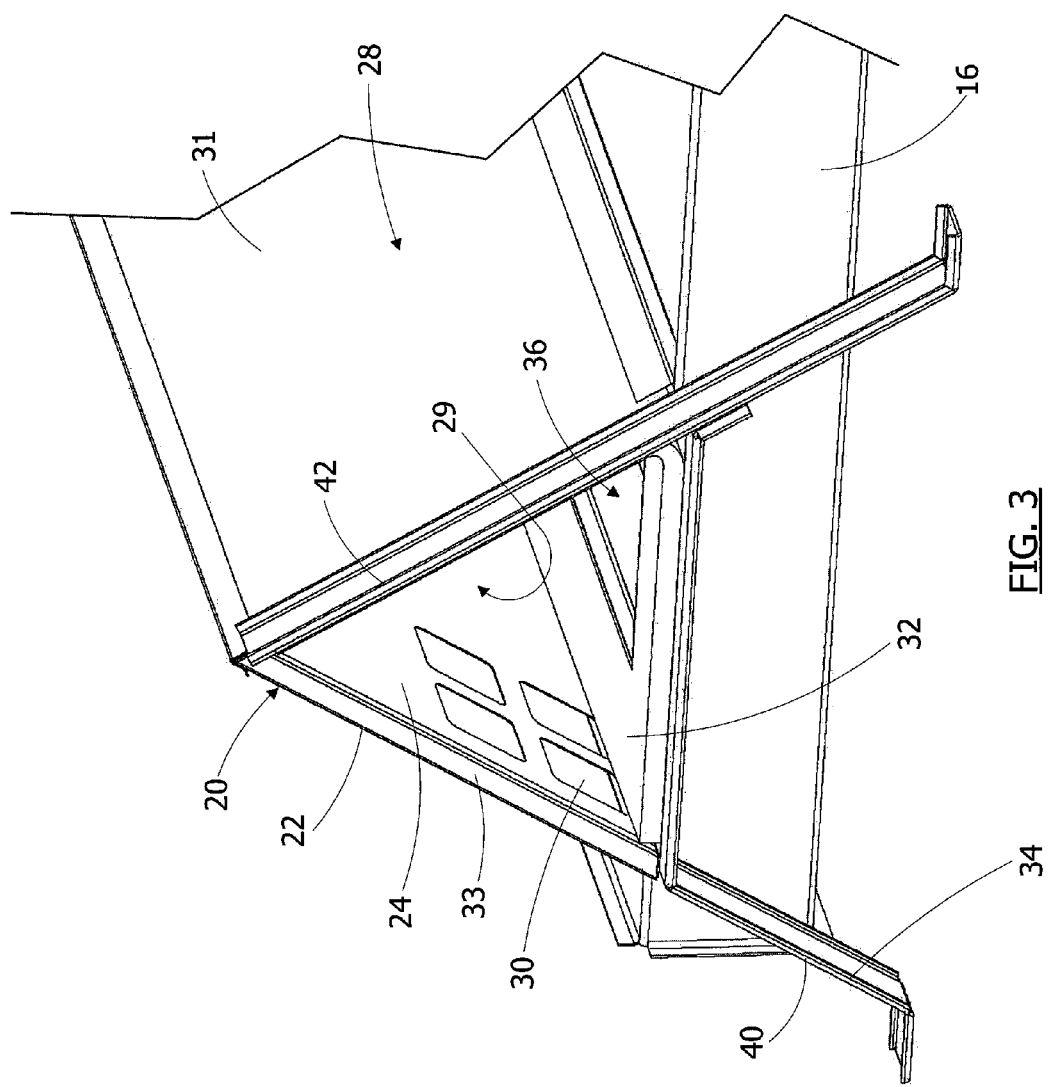
FIG. 3 is a close-up view of the modular collector system in accordance with another embodiment of the present invention.

With reference to FIG. 3, which shows an alternate embodiment of the duct 16 and its engagement with the module 12, a frame 34 is provided to support the modules 12 and provide them with additional structural integrity. Additionally, the frame 34 can be used to adjust the position of that module 12, and in particular its height and orientation. Preferably the frame 34 elevates the modules 12 from the roof surface in order to further stimulate snow shedding and reduce wind loading. Moreover, the frame 34 can be used to adjust the incident angle for increased solar gain based on geographic location of system 10, as well as installation flexibility and the means by which the individual modules 12 are connected in series.

The frame 34 forms a support structure comprising a plurality of front legs 40 and back legs 42. These legs 40 and 42 are preferably distributed at even intervals along the rows 14.

Preferably, the support structure 34 is of sufficient width to overlap two adjacent modules, thereby providing an attaching surface for the two. As such, interlocking housings 28 and collectors 20 may be connected to form a continuous and impervious duct for the flow of the fluid. The frame 34 is preferably constructed of heavy gauge steel or a non-ferrous material. The frame 34 attaches to the collector and plenum module 12.

Preferably, the rows 14 extend in a direction perpendicular to the local direct noon hour sunlight direction so as to maximize the exposure of the collectors 20 to the sun. Preferably, length of the front leg 40 may be increased or decreased to adjust the angle of the absorber plate 22 in a more direct alignment with the sun thereby providing increased performance depending upon the latitude of the system's installation. Typically lower latitudes will require a lower angle from the horizontal and higher latitudes vice versa. It will be appreciated that the northern or southern hemisphere latitude, and hence the incident angle of the sunlight, can also effect the preferred spacing of the rows 14.

As not all building surfaces are identical and geographic locations vary considerably in their wind and snow loads the frame 34 is designed to facilitate a ballasted, tie-down, mechanical attachment or combination of these means of attachment to a building roof or wall or ground.

The connection between adjacent modules 12 in each row 14 can be made via the frame 34. The connection between the modules 12 in parallel can be made via the duct 16.

As mentioned above, the embodiment of the duct 16 illustrated in FIG. 3, as well as its connection with the module 12, is different from that shown in FIG. 1. In this embodiment, the duct 16 is provided extending beneath the module 12 and in a direction perpendicular thereto. An opening 36 is provided through the insulation 32, the bottom of the housing 28 and the top of the duct 16 so that air can flow from within the plenum 29 into the duct 16. Once again, it will be appreciated that variations of the size, shape and position of the openings 36 may also be used.

Figure 4:
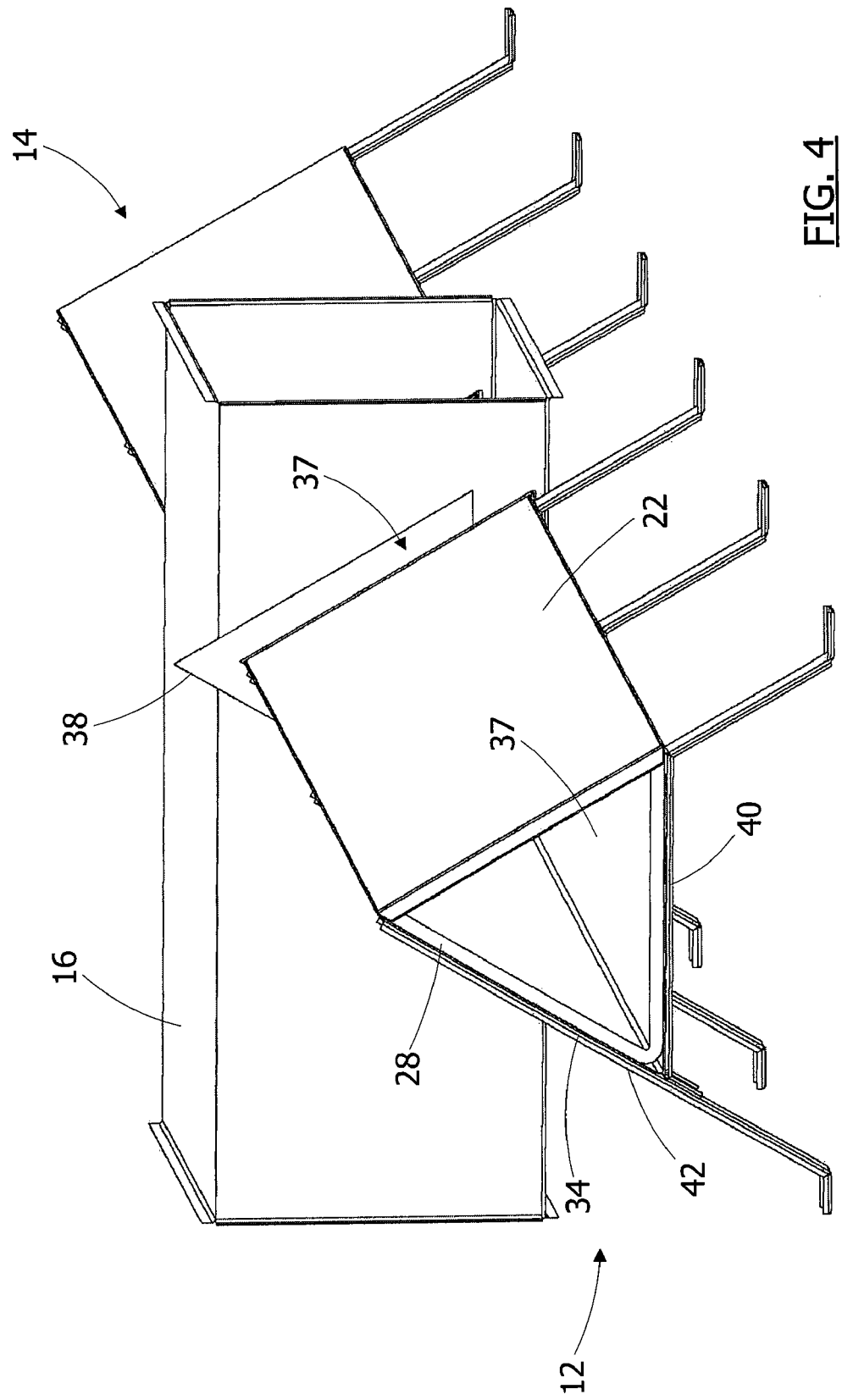
FIG. 4 is a close up of the modular collector system illustrated in FIG. 1.

With reference now to FIG. 4, a partial view of the embodiment shown in FIG. 1 is illustrated. Here, the duct 16 intersects the row 14 and attaches to adjacent modules 12 on either side along one of their openings 37 at a lateral extremity. As such, no separate opening 36 is required. A balancer 38, illustrated a balancing sheet 38 across the openings 37 in the first embodiment, is used to partially obstruct the air flow from the plenum 28 into the duct 16, thereby reducing the flow rate. Preferably, the amount of air flow blocked by the sheet is adjustable so that the air flow through each row 14 of a multi-row system 10 can be balanced. It will be appreciated that a similar balancing sheet 38 may be employed over the opening 36 discussed above.

In either of the embodiments shown in FIGS. 3 and 4, the air flow into the system 10 preferably occurs entirely through the absorber plate 22. Accordingly, modules 12 having a lateral side which is not attached to either another module 12 or a duct 16 are provided with an airtight end cap (not shown) in order to prevent air flow therethrough.

In addition, it is preferable to provide a bypass damper assembly installed between the outlet from the array 18 and the fresh air inlet to the building and/or the buildings HVAC fresh air inlet. The purpose of this damper is to prevent the unwanted infiltration of heated air, the control of which is usually temperature based. For example, in summer, the amount of fresh air required can be considerably higher than the amount of heated air required. For this purpose, a bypass box 17 (FIG. 1) is provided.

In use, the heat gain is first made as sunlight strikes the exterior absorber 22, which is preferably installed perpendicular to the local, direct noon hour sunlight direction, leaving a boundary layer of heat thereon. In addition, sunlight passes through the perforations 23 and strikes the collector tray 24, thereby producing heat. A negative pressure created in the plenums 28 by a building's HVAC system causes the heated air outside the absorber 22 to be pulled through the perforations 23 of each individual collector 20, thereby removing heat. This hot air then enters into the narrow cavity 44 formed between the absorber 22 and the collector tray 24 where it travels generally downward and across at high velocity. Preferably, this flow is turbulent, as caused by z-channels 26 within the air collection space. The air flows towards to the air outlet(s) 30, thereby further removes heat from the back of the absorber 22. This doubly heated air then passes through the outlet(s) 30 and is collected within the plenum 28.

Heat is also transmitted to the air passing through the insulated plenum 28 towards the duct 16. As that air comes into contact with the plenum-facing, interior side of the collector tray 24, the heat absorbed by the collector tray 24 is transferred to the air within the plenum 28, further increasing air temperature gain by means of convection. This temperature gain increases in direct relation to the length of the plenum 28 created by the connection of numerous modules 12 in series.

Multiple modules 12 operate together as each row 14 is connected to a header duct 16 located at the end or centrally below the row of modules 12. Multiple rows 14 may be connected at one end, from underneath or on adjacent sides of a centrally mounted header duct 16 in order to accumulate large volumes of air as required. The duct 16 is connected to an air handling unit or HVAC system. The bypass damper assembly may be used to avoid the intake of heated air during non heating periods when ventilation is required.

As will be appreciated, various considerations are taken into account when determining the optimum size and configuration of a system 10. Such considerations include the total volume of fresh air required, the dimensions of each module 12 and the distances between each row 14, the solar thermal array connection methods, the orientation of the collectors 20, the total available roof or wall area, a summer bypass air system and the means of mounting the solar thermal array to the building roof.

In addition, water pipes could be run through the plenum to pick up heat.

As such, it will be appreciated that a module 12, and a system 10 of multiple modules 12, in accordance with an embodiment of the present invention advantageously incorporates a dual heating process combining both transpired and backpass heat generation. Another aspect is the combination of a plenum 29 within an insulated housing 28 that is integrated behind the collector 20 itself creating a fully modular collector and plenum unit that may be joined in series and parallel as required for increased total air flow and temperature increase. It will be further appreciated that the modular nature of the system 12 advantageously enables a wide variety of possible configurations of modules 12 in series, parallel, some combination of these two. This modularity advantageously enables a module 12 or system 10 to be installed at various locations on a structure.

Research has also demonstrated that a profiled absorber surface may be subject to high heat losses that are exacerbated with increasing profile depth at low flow rates or in windy conditions. As such, another aspect therefore of the present system 10 and module 12 is a modular collector that minimizes the negative impact of the conventional vertical or horizontally profiled absorber is the use of a flat absorber plate that exposes a maximum and uniform area to the direct sunlight at all incident angles.

Yet another aspect is the use of deflectors 26 within the collector 20 to encourage turbulent flow. In the area close to the back of the absorber plate 24 air velocity in the collector is very low and can form a comparably warm but stagnant boundary layer that is preferably made turbulent either by the shape of the absorber 22 or depth of the air cavity in order to be captured. Within the air cavity 44 behind the absorber 22 and the back plate internal deflectors 26 are installed in order to create air turbulence thereby avoiding laminar air flow thus increasing temperature rise.

Such design characteristics may advantageously yield significantly higher efficiency in terms of combination of total air flow and temperature as well as overall cost improvements.

Additionally, it is possible to place a glazing over the exterior absorber plate 22 for increased temperature rise where space or process heating dictates a higher delivered air temperature. This aspect may also be used in conjunction with an air conditioning unit for space cooling.

The preferred embodiments discussed above draw in fresh air from outside the collector 20 and can therefore be considered an "open loop" system since new air is continually being introduced into the system. However, a module 12 or system 10 may also be used as part of a "closed loop" system wherein the modules 12 are used to heat recirculated air, that is air which is continually cycled throughout the building and ventilation system and gets re-heated as it passes through the modules 12. Either end of a module 12 or a system 10 may be connected to what might be considered the inlet and outlet of a building's ventilation system such that warm air from inside the building is recycled therethrough. Each module 12 is provided with an external glazing which is installed across the absorber plate 22, a short distance therefrom. This glazing prevents fresh air from outside the closed loop from entering. Recirculated air will be fed into the space between the absorber plate 22 and the glazing, although that space will be sealed to prevent the infiltration of fresh air.

The expression "outside air" as used in conjunction with this "closed loop" embodiment should be understood to refer to the air just outside the collector 20 proximate the absorber plate 22 and within the space between the absorber plate and the glazing. This outside air is not fresh air, as considered in previous embodiments, but rather recirculated air travelling through the closed loop. Sunlight will pass through the glazing and then heat the recirculated outside air along the absorber plate 22, which will then drawn into the collector 20, and so on. Preferably, a bypass system is also included in the closed loop in order to permit the addition of a controlled amount of outside air into the system.

Alternatively a photovoltaic module could be placed over the exterior absorber plate 22, preferably below and slightly overlapping the lower portion of the absorber plate such that the hot air emanating from it may be aspirated by the absorber 22, for increased temperature rise where space or process heating dictates a higher delivered air temperature or where the production of electricity is also required.

It will be appreciated that the modules 12 may be roof mounted using a variety of means, such as exterior ballast, mechanical fasteners, tie-downs and/or a combination of two or more of the aforementioned. In addition, it will be appreciated that the modules 12 may be wall mounted using mechanical fasteners.

It will be appreciated that a module or system in accordance with the present invention can combine the modular benefits of the typical glazed collector and the ease, cost effectiveness and efficiency of the transpired and backpass designs resulting in a much higher overall efficiency, design and installation flexibility at reduced cost of current unglazed designs. Using transpired technology initial solar heat gain is optimized as each individual collector is designed to operate at its highest air flow efficiency.

As being now better appreciated, the present invention is an improvement and presents several advantages over other related devices and/or methods known in the prior art.

Of course, numerous modifications could be made to the above-described embodiments without departing from the scope of the invention, as apparent to a person skilled in the art.

The invention claimed is:

1. A solar air heating module for providing heated air to a ventilation system, the solar air heating module comprising:
    a) a collector for heating and drawing in outside air comprising:
        i) an absorber plate for absorbing incident sunlight and comprising a plurality of perforations therethrough, the perforations distributed across the absorber plate for allowing passage of air into the collector; and
        ii) a collector tray mounted behind the absorber plate, the collector tray comprising an output provided with a plurality of openings distributed across the collector tray for allowing the passage of air out of the collector, the collector tray being spaced from the absorber plate to define a cavity therebetween in which air can to flow towards the output;
    b) a housing mounted to the collector tray and forming a plenum therewith for receiving air from the output, the plenum being at a lower pressure than that of the outside air, the plenum being connected to the ventilation system.

2. The solar air heating module of claim 1, wherein the housing comprises a casing connected to the collector and an insulating layer disposed along the casing.

3. The solar air heating module of claim 1, wherein the collector and housing form a triangular cross-section.

4. The solar air heating module of claim 1, wherein the absorber plate is flat.

5. The solar air heating module of claim 1, wherein the collector further comprises a projection within the cavity.

6. The solar air heating module of claim 1, wherein the output is positioned at a bottom corner of the collector tray.

7. A solar air heating system for providing heated air to a ventilation system comprising a plurality of connected modules, each module comprising:
    a) a collector for heating and drawing in outside air comprising:

i) an absorber plate for absorbing incident sunlight and comprising a plurality of perforations therethrough, the perforations distributed across the absorber plate for allowing passage of air into the collector; and ii) a collector tray mounted behind the absorber plate, the collector tray comprising an output provided with a plurality of openings distributed across the collector tray for allowing the passage of air out of the collector, the collector tray being spaced from the absorber plate to define a cavity therebetween in which air can to flow towards the output;

b) a housing mounted to the collector tray and forming a plenum therewith for receiving air from the output, the plenum being at a lower pressure than that of the outside air;

wherein at least one of the plenums is connected to the ventilation system.

8. The solar air heating system of claim 7, further comprising a frame for adjusting at least one of the modules' position.

9. The solar air heating system of claim 7, further comprising a duct for connecting at least a portion of the modules in parallel.

10. The solar air heating system of claim 9, wherein the duct is connected to at least one of the plurality of modules through an opening in its housing.

11. The solar air heating system of claim 9, wherein the duct is connected to at least one of the plurality of modules at an extremity of its housing.

12. The solar air heating system of claim 7, wherein the at least a portion of the modules are connected in series at extremities of their respective housings, thereby forming a row.

13. The solar air heating system of claim 7, further comprising a balancer between the plenum and the ventilation system.

14. The solar air heating system of claim 7, further comprising a bypass damper assembly between the modules and the ventilation system.

15. The solar air heating system of claim 7, wherein the output of each collector is positioned at a bottom corner of the collector tray.

* * * * *